United States Patent
McGuire et al.

(10) Patent No.: US 12,025,270 B2
(45) Date of Patent: Jul. 2, 2024

(54) EMERGENCY STOP SYSTEM FOR DRILL FLOOR SAFETY

(71) Applicant: Transocean Sedco Forex Ventures Limited, Grand Cayman (KY)

(72) Inventors: Travis McGuire, Houston, TX (US); Brad Hamilton, Houston, TX (US); Jerald Colbert, Houston, TX (US); Shane McClaugherty, Houston, TX (US)

(73) Assignee: TRANSOCEAN SEDCO FOREX VENTURES LIMITED, Grand Cayman (KY)

( * ) Notice: Subject to any disclaimer, the term of this patent is extended or adjusted under 35 U.S.C. 154(b) by 273 days.

(21) Appl. No.: 17/566,792

(22) Filed: Dec. 31, 2021

(65) Prior Publication Data

US 2022/0120160 A1  Apr. 21, 2022

Related U.S. Application Data

(63) Continuation of application No. PCT/US2020/040281, filed on Jun. 30, 2020.
(Continued)

(51) Int. Cl.
*F16P 3/12* (2006.01)
*F16P 3/14* (2006.01)
(Continued)

(52) U.S. Cl.
CPC .............. *F16P 3/12* (2013.01); *G05B 19/058* (2013.01); *G05B 19/4061* (2013.01); *G05B 2219/14006* (2013.01); *G05B 2219/45129* (2013.01)

(58) Field of Classification Search
CPC ........................................................ F16P 3/12
See application file for complete search history.

(56) References Cited

U.S. PATENT DOCUMENTS

| 7,823,656 | B1* | 11/2010 | Williams | ................ | E21B 21/01 |
| | | | | | 175/38 |
| 2011/0174538 | A1* | 7/2011 | Chan | ...................... | E21B 44/02 |
| | | | | | 175/24 |

(Continued)

OTHER PUBLICATIONS

ABB Automation Products GmbH, "Welcome to AC500-S Safety PLC Engineering Functional Safety," downloaded from web page: <https://www.library.e.abb.com/, downloaded date: Jun. 1, 2023, 32 pages.
(Continued)

*Primary Examiner* — Joseph H Feild
*Assistant Examiner* — Pameshanand Mahase
(74) *Attorney, Agent, or Firm* — Panitch Schwarze Belisario & Nadel LLP (57) ABSTRACT

In some embodiments, a controller is configured to be operably coupled to a series of safety relays. Each safety relay is coupled to a machine from a plurality of machines. The controller is configured to receive a signal indicative of a potential collision between any machine from the plurality of machines that is coupled to the at least one of the safety relays that was activated. The controller is configured to send, in response to the signal indicative of the potential collision, a signal to at least one of the safety relays from the series of safety relays to activate the at least one of the safety relays, thereby stopping motion of any machine from the plurality of machines that is coupled to the at least one of the safety relays that was activated.

11 Claims, 9 Drawing Sheets

Related U.S. Application Data (60) Provisional application No. 62/869,216, filed on Jul. 1, 2019.

(51) Int. Cl.
  *G05B 19/05* (2006.01)
  *G05B 19/4061* (2006.01)

(56) References Cited

U.S. PATENT DOCUMENTS

| | | | |
|---|---|---|---|
| 2012/0221137 A1* | 8/2012 | Kettemer | G05B 19/4061 700/108 |
| 2013/0120547 A1 | 5/2013 | Linnell | |
| 2014/0251935 A1* | 9/2014 | Behnke | B66C 13/18 212/285 |
| 2014/0333771 A1 | 11/2014 | Mian et al. | |
| 2015/0197993 A1* | 7/2015 | Lee | E21B 15/003 52/115 |
| 2017/0314369 A1* | 11/2017 | Rosano | G06F 18/2413 |
| 2019/0041821 A1 | 2/2019 | Stagg et al. | |

OTHER PUBLICATIONS

Control Engineering, Magazine and Newsletters "EC: AC500-S Safety PLC Control Engineering," downloaded from web page: <https://www.controleng.com/, downloaded date: Jun. 1, 2023, 3 pages.
Control Engineering, Magazine and Newsletters "AC500-S Safety User Manual V1.1.0 Original Instructions (1)," downloaded from web page: <https://www.library.e.abb.com/, downloaded date: Jun. 1, 2023, 176 pages.
Extended European Search Report Issued Jun. 12, 2023 in EP Application No. 20834432.
Int'l Search Report and Written Opinion issued Sep. 25, 2020 in Int'l Application No. PCT/US20/40281.
Int'l Preliminary Report on Patentability issued Dec. 28, 2021 in Int'l Application No. PCT/US2020/040281.

* cited by examiner

| receiving an indication of a potential collision between a machine in motion and personnel | 202 |

↓

| based on the indication, sending, without user intervention, a signal to a safety relay via a bus coupler, both of which are operably coupled to the machine in motion, such that the safety relay is activated and the machine in motion is stopped | 204 |

600 receiving an indication of a potential collision between a machine in motion and personnel — 602

↓ based on the indication, sending, without user intervention, a signal to a safety relay that is operably coupled to the machine in motion, such that the safety relay is activated and the machine in motion is stopped — 604

```
┌─────────────────────────────────────────────┐
│ receiving an indication of a potential      │
│ collision between a machine in motion and   │    802
│ personnel                                   │
└─────────────────────────────────────────────┘
                      │
                      ▼
┌─────────────────────────────────────────────┐
│ based on the indication, sending, without   │
│ user intervention, a signal to a safety     │
│ relay that is operably coupled to the       │    804
│ machine in motion, such that the safety     │
│ relay is activated and the machine in       │
│ motion is stopped                           │
└─────────────────────────────────────────────┘
                      │
                      ▼
┌─────────────────────────────────────────────┐
│ receive an indication of machine emergency  │    806
│ stop status                                 │
└─────────────────────────────────────────────┘
```

EMERGENCY STOP SYSTEM FOR DRILL FLOOR SAFETY

CROSS-REFERENCE TO RELATED APPLICATIONS

This application is a continuation of International Patent Application No. PCT/US2020/040281, entitled "Improved Emergency Stop System For Drill Floor Safety", filed Jun. 30, 2020, which claims priority to U.S. Provisional Application No. 62/869,216, entitled "Emergency Stop System For Drill Floor Safety", filed Jul. 1, 2019, the entire disclosure of each of which is incorporated herein by reference.

BACKGROUND

The present disclosure relates generally to the field of control systems and methods, and in particular, to collision avoidance control in drilling operations.

Oil and gas drilling operations have evolved over the years to include multiple automated tool subsystems. Automated tool subsystems, machines, equipment, and the like, aid in executing repetitive tasks on the drill floor including, for example, drilling, tripping, casing, and cementing. Tool automation optimizes the rate of penetration, makes hole quality more consistent, reduces operation time, improves overall drilling performance, and reduces the cost of drilling operations. More importantly, tool automation reduces the number of people required to work in and around the hazardous drill floor environment. The overwhelming majority of drilling operations are not fully automated, therefore some tasks are still performed by humans working alongside heavy drilling machinery. The automated tool systems pose new challenges for maintaining a safe workspace for personnel, where people and machines must share the same operating environment.

Existing automated equipment is designed to operate (e.g., to stop and/or start) in accordance with its own control system design defined by its manufacturer. To incorporate automated safety protocols into such equipment requires cost and time intensive measures, such as, for example, complex software and/or computer hardware programming that may be unique to each piece of equipment and limited by constraints defined by the manufacturers of the equipment. Further, existing emergency-stop systems for automated equipment requires manual user-intervention (e.g., a user must engage a physical button). Accordingly, a need exists for a secondary, external, and/or independent system that can halt and/or otherwise alter equipment movement to improve machine and human co-operative environments and avoid collisions within those environments.

DETAILED DESCRIPTION

Collision avoidance is a component of automated tool subsystems that mitigates the possibility of two or more tools from colliding with one another. The systems that attempt to mitigate tool collision are known by various names: anti-collision systems (ACS), collision avoidance systems (CAS), zone management systems (ZMS), but all share a common goal. In some tool collision avoidance applications, virtual and real world (Cartesian) coordinate systems are correlated and define the drill floor space. A bounding box surrounds a tool in virtual space and establishes a volume occupied by the tool. The bounding box may also be axis-aligned, in which case the virtual space surrounding the tool changes dynamically as the tool appendages extend, rotate, retract, raise, lower, etc. A proximity zone surrounds the bounding box and defines a hazardous area around the tool. Collision avoidance systems monitor tool positions and movement, and predict a location of a moving tool. Collision avoidance systems will override automated tool operations to prevent a virtual overlap of the projected bounding boxes, i.e. a real-world tool collision.

Despite the move in the industry towards automated tool subsystems, personnel such as drill hands continue to be a necessary component of the drilling operation. Drill floor personnel are a dynamic component of the drilling operation that are not monitored by existing tool collision avoidance systems. Collision avoidance, for example, between drill floor personnel and automated tools depends on the situational awareness of the rig hands (i.e., drill floor personnel). The avoidance of an automated tool presents an unnecessary distraction to a drill hand in an already hazardous environment. And, to date, in many instances, personnel position on the drill floor relative to equipment has not been considered outside of procedural control through the application of the restricted access principle, and of the hierarchy of control that focuses on procedural control. In the few instances in which personnel position on the drill floor relative to equipment is monitored and/or detected (e.g., to generate an alert or series of alerts when a person passes one or more proximity thresholds), existing emergency-stop systems require manual user-intervention to stop and/or alter the operation of a machine in response to detection of a potential collision between personnel and a machine.

Existing drill floors, for example, include machines with embedded emergency-stop hardware and/or software protocol, including a physical button collocated with the machine (e.g., on the machine or on a physical structure, like a wall, near the machine), such that personnel nearby can respond to the potential collision by pressing the button to activate the machine's own emergency-stop system, thereby stopping and/or alerting movement of the machine. In other instances, an operator within a drill floor control cabin can activate an emergency-stop sequence using the drill floors' operator control system in response to detection of a potential collision, and often such a sequence stops more machines than necessary (e.g., a "kill all" emergency scenario in which all machines are shut down). In either case, preventing a collision in real-time requires user-intervention.

Accordingly, there is a need in the art for a system and method that can automatically (i.e., without user intervention) react to a collision avoidance system's detection of a potential collision in a cooperative human-machine workspace or environment by selectively stopping and/or otherwise alternating the operation of one or more machines and/or tools.

For purposes of the present disclosure, a "machine in motion," "movable machine," and the like, refers to any type of automation, machinery, and/or equipment used in industry. For example, in some cases a machine in motion may include an automated tool subsystem or automated machinery or equipment, such as in the form of a wholly or partially automated drill, crane, gantry, pipe racker, iron roughneck, riser skate, pipe skate, and/or any other type of load-bearing equipment as such may be used in the industry. Further, in some embodiments, a machine in motion is related to non-drilling controls, such as, for example, shakers, cranes, etc. In any case, a machine in motion may include any type of automation or semi-automation capable of causing physical harm or damage to a human, such as by collision.

For purposes of the present disclosure, "personnel" refers to one or more people, persons, humans, or workers exposed to risk of collision or impact with one or more machines in motion, such as in a hazardous environment, as previously described. For example, in some cases one or more personnel may include drill floor personnel such as a drill hand. In other cases, one or more personnel may include, for example, emergency relief personnel and/or related first responders. In any case, personnel may include any type of entity exposed to risk of harm or damage, such as by collision.

For purposes of the present disclosure, a "hazardous environment" refers to an environment, volume, space, or area in which a cooperative, human-machine industrial operation or task may be performed. In some cases, a hazardous environment may include one having poor, bad, unideal, or otherwise harsh environmental conditions ("harsh environmental conditions" or "harsh conditions" or "environmental conditions"). For example, a harsh environmental condition may be caused by exposure of the environment to extreme or severe weather, an occurrence of an explosion or smoke in the environment, hazardous materials, and the like. In any case, a harsh environmental condition may include any environmental condition in the environment by which unsuitable operating conditions may be caused and occur in the environment. For example, during a first time period a hazardous environment may include harsh environmental conditions (e.g. as in severe weather, etc.), and during a second time period may not include harsh environmental conditions (e.g. as in calm weather, etc.). Accordingly, during the second time period, the harsh environmental conditions may increase a risk of collision or impact between personnel and one or more machines in motion, such as by causing reduced visibility in the environment, and so on. In any case, a hazardous environment may include any type of environment or space that may be concurrently or simultaneously occupied or shared by personnel and one or more machines in motion.

In some embodiments, an apparatus includes a controller configured to be operably coupled to a series of safety relays. Each safety relay is coupled to a machine from a plurality of machines. The controller is configured to receive a signal indicative of a potential collision between any machine from the plurality of machines that is coupled to the at least one of the safety relays that was activated. The controller is configured to send, in response to the signal indicative of the potential collision, a signal to at least one of the safety relays from the series of safety relays to activate the at least one of the safety relays, thereby stopping motion of any machine from the plurality of machines that is coupled to the at least one of the safety relays that was activated.

In some embodiments, a method includes receiving a signal indicative of a potential collision between a machine in motion and personnel. Based on the signal indicative of the potential collision, the method further includes sending, without user intervention, a signal to a safety relay such that the safety relay is activated and the machine in motion is stopped. The machine in motion is operably coupled to the safety relay.

In some embodiments, a method includes receiving an indication of a potential and/or impending collision between a machine in motion (or machines in motion) on a drill rig floor and personnel (e.g., a human) on the drill rig floor. In some instances, for example, the indication could be based on (1) image analytics conducted on an image that was captured by an optical camera disposed to capture images of a drill rig floor, and/or (2) a positional sensor disposed at or near the drill rig floor, to identify personnel within a predefined or virtual zone associated with the machine. In this manner, for example, detection of a potential and/or impending collision between a machine and personnel can be accomplished in real-time without user intervention. The method further includes, sending, automatically and without user intervention, and in response to the indication, a signal to selectively decouple power supply to the machine (or machines) to halt the machine (or machines).

As described above, in some instances, existing automated equipment (e.g., drill floor equipment) is designed to operate (including executing an emergency-stop procedure) in accordance with its own control system design defined by its manufacturer, resulting in timely and costly measures for an operator other than the manufacturer to incorporate a safety protocol (e.g., to selectively stop one or more machines to prevent a collision) across a machine floor having multiple machines designed by various manufacturers. In such instances, for example, instead of or in addition to selectively decoupling a power supply to a machine to halt the machine, a method can include incorporating additional hardware into the machine to provide an operator with an avenue to actuate the machine's existing emergency-stop capability, without necessarily requiring introducing additional and/or reprogramming software into the machine's control system. In such embodiments, for example, a method includes receiving an indication of a potential and/or impending collision between a machine in motion (or machines in motion) on a drill rig floor and personnel (e.g., a human) on the drill rig floor. In some instances, for example, the indication could be based on (1) image analytics conducted on an image that was captured by an optical camera disposed to capture images of a drill rig floor, and/or (2) a positional sensor disposed at or near the drill rig floor to identify personnel within a predefined or virtual zone associated with the machine. In this manner, for example, detection of a potential and/or impending collision between a machine and personnel can be accomplished in real-time without user intervention. The method further includes, sending, automatically and without user intervention, and in response to the indication, a signal to and/or via after-market hardware operably coupled to the machine to actuate the machine's manufacturer-provided emergency stop capability to halt the machine (or machines). A machine's manufacturer-provided emergency stop capability to halt the machine can include, for example, a safety relay integrated with or coupled to the machine (which may in some instances be coupled to a physical stop button designed to be activated manually by a user). In such instances, the signal can be sent to the machine to actuate the safety relay to halt the machine. In this manner, the machine can be stopped to prevent a collision without requiring user input in real-time and without requiring complex software integration with the machine's control system.

Figure 1:
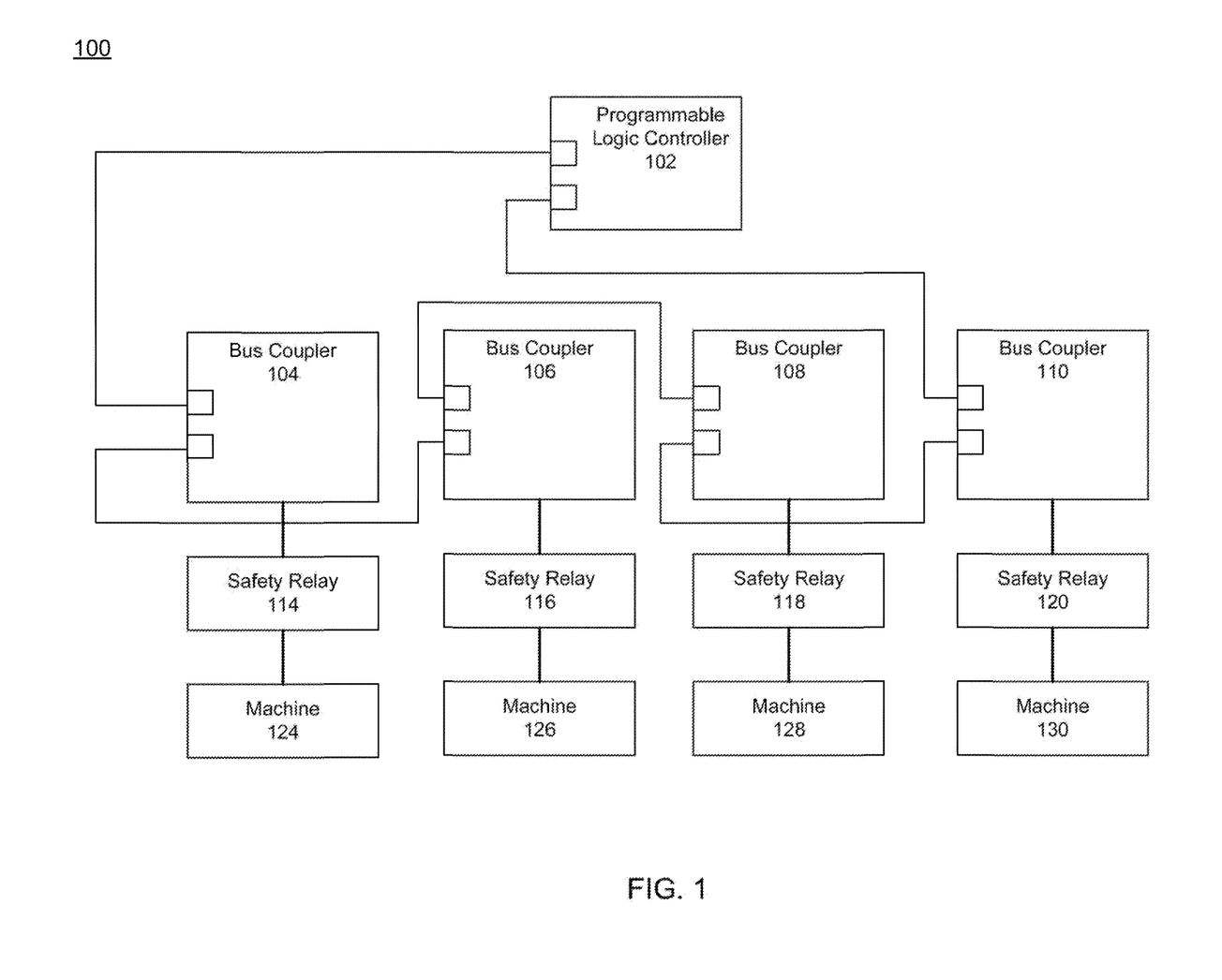
FIG. 1 is a schematic diagram depicting an example of an emergency safety system, in accordance with an embodiment.

FIG. 1 is a schematic diagram depicting an emergency stop system 100, in accordance with an embodiment. The emergency stop system 100 includes a programmable logic controller 102 coupled to a series of bus couplers 104-110, with each bus coupler coupled to a corresponding safety relay 114-120 and machine 124-130. More specifically, as shown, bus coupler 104 is coupled to machine 124 via safety relay 114, bus coupler 106 is coupled to machine 126 via safety relays 116, bus coupler 108 is coupled to machine 128 via safety relay 118, and bus coupler 110 is coupled to machine 130 via safety relay 120. Although in this embodiment the emergency stop system 100 is shown and described as having one programmable logic controller, four bus couplers, four safety relays, and four machines, in other embodiments, similar emergency stop systems can include any suitable number of controllers, couplers, relays, and machines.

The machines 124-130 can be any machine capable of being a machine in motion, such as, for example, as referred to above, an automatic tool subsystem, automated machinery or equipment, a pipe racker, an iron roughneck, a riser catwalk, a pipe catwalk, and/or the like. The bus couplers 104-110 can be any suitable type or types of bus couplers and the safety relays 114-120 can be any suitable type or types of safety relays. One or more of the safety relays 114-120, for example, in some embodiments, can have an associated safety integrity level rating (e.g., an industry standard or threshold). In some implementations, the safety relays 114-120 can include a forced guiding contact structure, ensuring safety even in the event of contact sintering, or the like.

In use, the programmable logic controller 102 can be configured to receive a signal indicative of a potential collision between a machine in motion and personnel, and in response to and/or based on that received signal, the programmable logic controller 102 can be configured to send a signal to one or more of the bus couplers 104-110 to selectively stop one or more of the machines 124-130. For example, in an instance in which it is detected that personnel may collide with machine 124, the programmable logic controller 102 can be programmed to, based on the detection, send a signal to bus coupler 104 to activate the safety relay 114, and thereby stop the machine 124. In this manner, the emergency stop system 100 is capable of selectively stopping the machine 124 in response to and/or based on a detection that the machine 124 may collide with personnel, without requiring user-intervention. Further to this example, in some instances, the bus coupler 104 can include a relay component (e.g., a relay card) that is configured to receive a signal instructing it to open. The safety relay 114 can be configured to detect the opening of the relay component (e.g., detect an open circuit), and in response to such detection, the safety relay 114 can be configured to energize to selectively de-energize or otherwise stop the machine 124.

In further instances, in which for example it is detected that personnel may collide with additional machines, e.g., machine 124 and machine 126, the programmable logic controller 102 can be configured to send a signal to (1) bus coupler 104 to activate the safety relay 114, and thereby stop the machine 124, and to (2) bus coupler 106 to activate the safety relay 116, and thereby stop the machine 126.

In yet further instances, in which for example it is detected that personnel may collide with one or more machines, it may be desirable to stop one or more additional machines that although may not be in danger of colliding with personnel, may be in danger of colliding with one or more additional machines due to stoppage of the one or more machines that was in the path of a potential collision. Said another way, in the context of a drill floor on an oil rig, machines often operate in conjunction with one another, so in an example scenario in which the machine 124 is a drawworks machine handling a series of tubulars, and the machine 126 is a catwalk machine handling a tubular and moving towards the drawworks, if the drawworks is stopped by the emergency stop system 100 to avoid a collision with personnel, the programmable logic controller can be configured to stop the catwalk machine based on (1) the drawworks machine being stopped and/or (2) planned programmed interaction between the catwalk machine and the drawworks machine.

Figure 2:
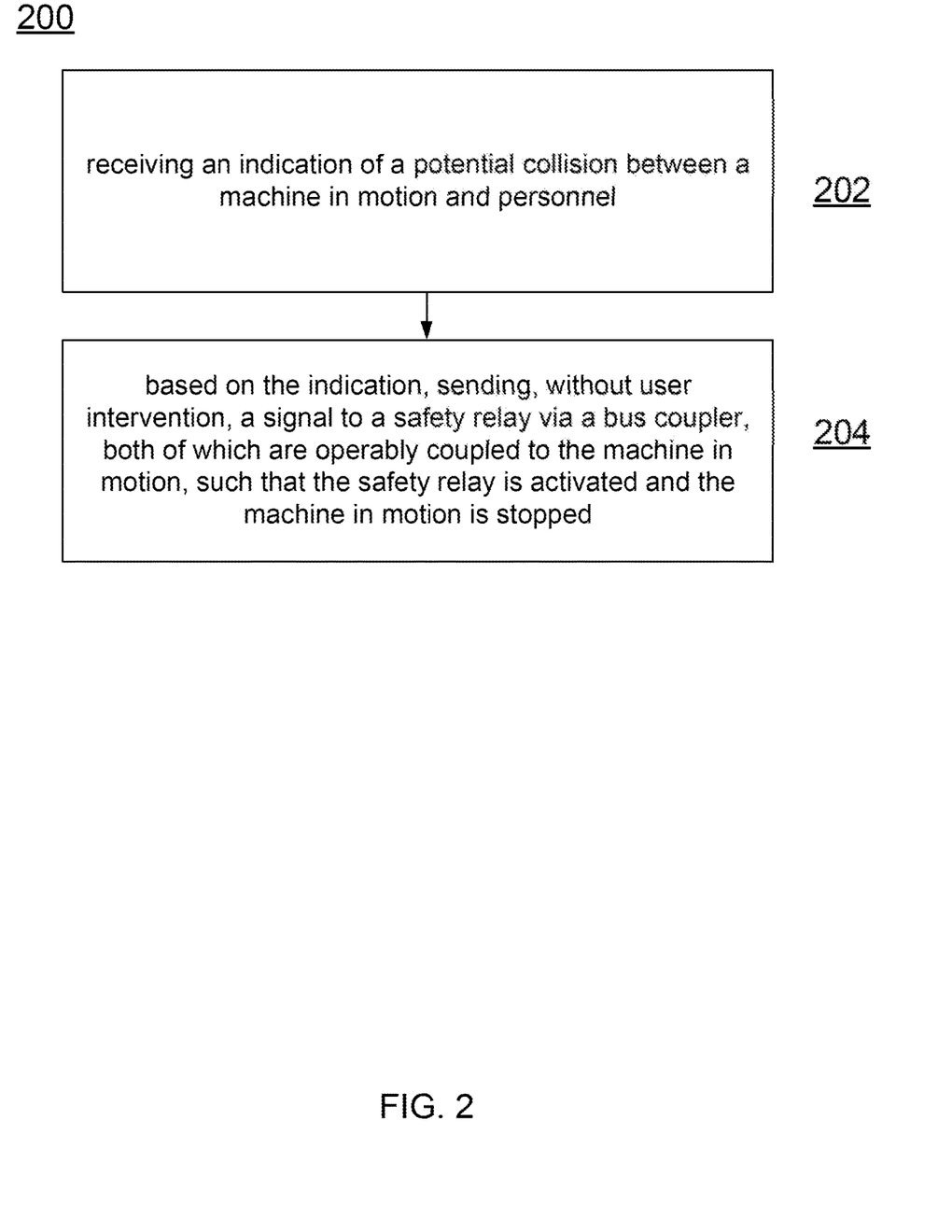
FIG. 2 is a flowchart depicting operational steps of an aspect of an emergency safety system, in accordance with an embodiment.

FIG. 2 is a flowchart depicting operational steps of an aspect of an emergency stop system 200, in accordance with an embodiment. The emergency stop system 200 can in form and/or in function be the same as or similar to any emergency stop system described herein (e.g., emergency stop system 100).

At 202, the emergency stop system 200 receives an indication of a potential collision between a machine in motion and personnel. The indication, for example, in some instances, can be received at and/or processed by a controller (e.g., programmable logic controller 102). At 204, based on the indication of the potential collision between the machine in motion and personnel, a signal can be sent, without user intervention, to a safety relay via a bus coupler (both the safety relay and the bus coupler being coupled to the machine in motion), such that the safety relay is activated and the machine in motion is stopped.

Figure 3:
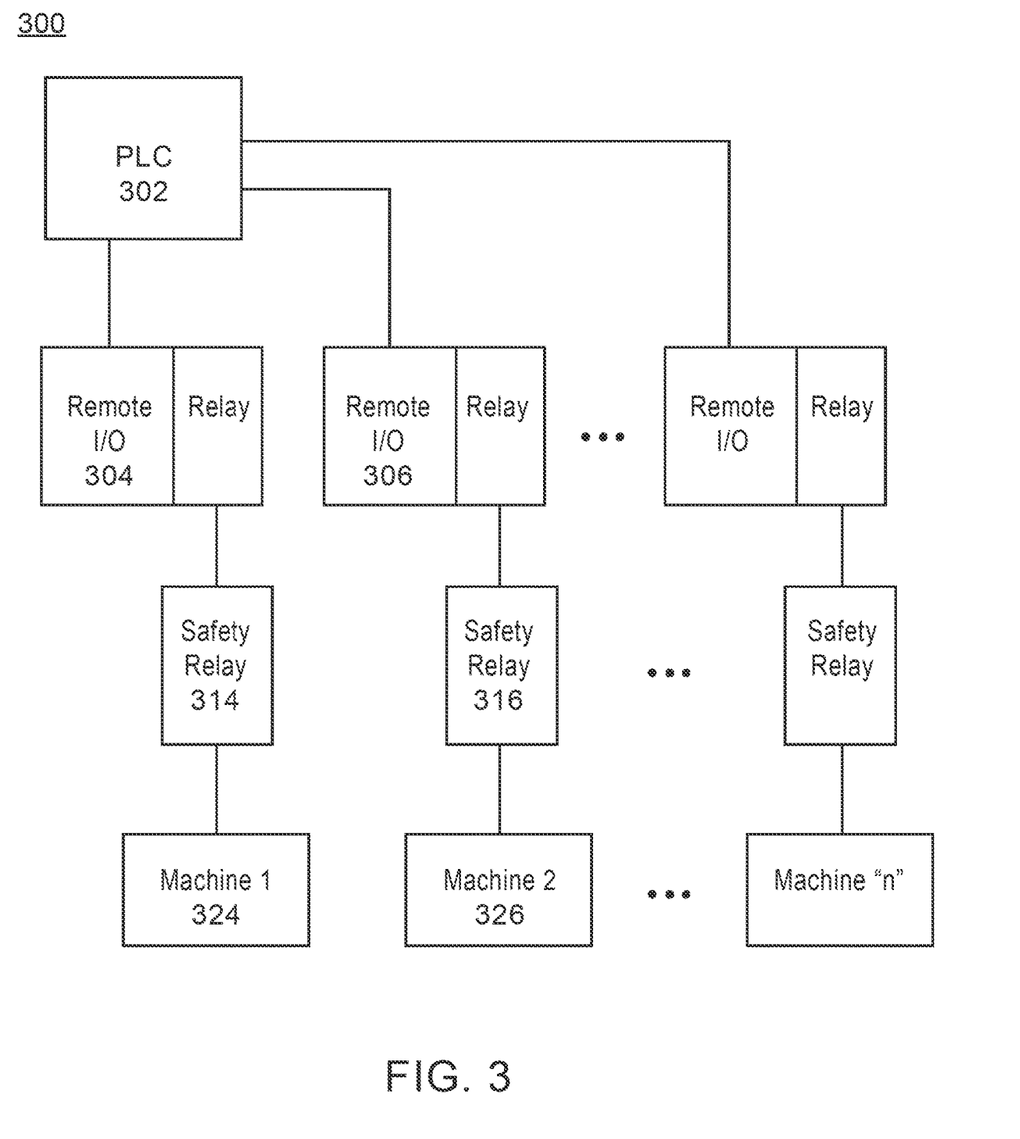
FIG. 3 is a schematic diagram depicting an example of an emergency safety system, in accordance with an embodiment.

FIG. 3 is a schematic diagram depicting an emergency stop system 100, in accordance with an embodiment. The emergency stop system 300 includes a programmable logic controller ("PLC") 302 coupled to a series of remote input/output with relay devices 304, 306, with each remote input/output with relay device 304, 306 coupled to a corresponding safety relay 314, 316 and machine 324, 326. More specifically, as shown, remote input/output with relay device 304 is coupled to machine 324 via safety relay 314, and remote input/output with relay device 306 is coupled to machine 326 via safety relay 316. Although in this embodiment the emergency stop system 300 is shown and described as having a particular number of controllers, devices, relays, and machines, in other embodiments, similar emergency stop systems can include any suitable number of controllers, devices, relays, and machines.

The machines 324, 326 can be any machine capable of being a machine in motion, such as, for example, as referred to above, an automatic tool subsystem, automated machinery or equipment, a pipe racker, an iron roughneck, a riser catwalk, a pipe catwalk, and/or the like. The remote input/output with relay devices 304, 306 can be of any suitable type and the safety relays 314, 316 can be of any suitable type.

In use, the programmable logic controller 302 can be configured to receive a signal indicative of a potential collision between a machine in motion and personnel, and in response to and/or based on that received signal, the programmable logic controller 302 can be configured to send a signal to one or more of the remote input/output with relay devices 304, 306 to selectively stop one or more of the machines 324, 326. For example, in an instance in which it is detected that personnel may collide with machine 324, the programmable logic controller 302 can be programmed to, based on the detection, send a signal to the remote input/output with relay device 304 to activate the safety relay 314, and thereby stop the machine 324. In this manner, the emergency stop system 300 is capable of selectively stopping the machine 324 in response to and/or based on a detection that the machine 324 may collide with personnel, without requiring user-intervention.

In further instances, in which for example it is detected that personnel may collide with additional machines, e.g., machine 324 and machine 326, the programmable logic controller 302 can be configured to send a signal to (1) remote input/output with relay device 304 to activate the safety relay 314 and thereby stop the machine 324, and to (2) remote input/output with relay device 306 to activate the safety relay 316 and thereby stop the machine 326.

In yet further instances, in which for example it is detected that personnel may collide with one or more machines, it may be desirable to stop one or more additional machines that although may not be in danger of colliding with personnel, may be in danger of colliding with one or more additional machines due to stoppage of the one or more machines that was in the path of a potential collision. Said another way, in the context of a drill floor on an oil rig, machines often operate in conjunction with one another, so in an example scenario in which the machine 324 is a drawworks machine handling a series of tubulars, and the machine 326 is a catwalk machine handling a tubular and moving towards the drawworks, if the drawworks is stopped by the emergency stop system 300 to avoid a collision with personnel, the programmable logic controller can be configured to stop the catwalk machine based on (1) the drawworks machine being stopped and/or (2) planned or programmed interaction between the catwalk machine and the drawworks machine.

Although not shown in FIG. 3, in some embodiments, the emergency stop system 300 can include a machine state feedback communication path to communicate an emergency stop state of one or more machines (e.g., machine 324, machine 326, etc.) to the relay(s) (e.g., 304, 306, etc.) and/or the PLC 302. For example, a signal representative of an emergency stop state of machine 324 can be sent to relay 304. The emergency stop state can be, for example, indicative of the machine 324 being stopped by the emergency stop system 300, or functioning under operating conditions, etc. Any suitable number of machine state feedback communication paths can be included, e.g., each machine can have a machine state feedback communication path through which it can communicate its state to a relay and/or the PLC 302. Further, in some implementations, the emergency stop state can be indicative of a machine being stopped by the emergency stop system 300 (e.g., without user intervention), or a local trigger such as an emergency stop button disposed at or on a particular machine, triggered by personnel collocated with that machine.

Figure 4:
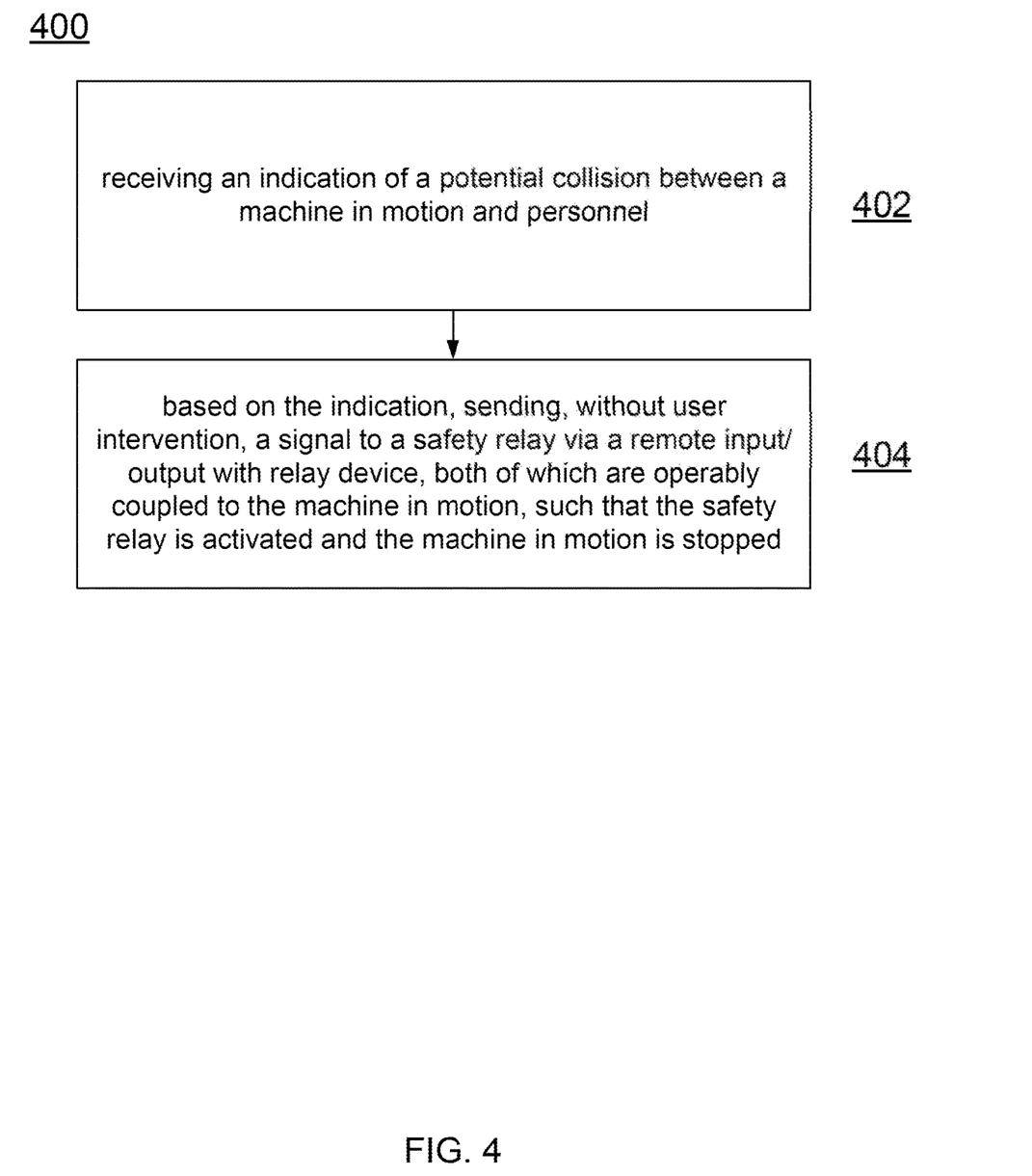
FIG. 4 is a flowchart depicting operational steps of an aspect of an emergency safety system, in accordance with an embodiment.

FIG. 4 is a flowchart depicting operational steps of an aspect of an emergency stop system 400, in accordance with an embodiment. The emergency stop system 400 can in form and/or in function be the same as or similar to any emergency stop system described herein.

At 402, the emergency stop system 400 receives an indication of a potential collision between a machine in motion and personnel. The indication, for example, in some instances, can be received at and/or processed by a controller (e.g., programmable logic controller 302). At 404, based on the indication of the potential collision between the machine in motion and personnel, a signal can be sent, without user intervention, to a safety relay via a remote input/output with relay device (both the safety relay and the remote input/output with relay being coupled to the machine in motion), such that the safety relay is activated and the machine in motion is stopped.

Figure 5:
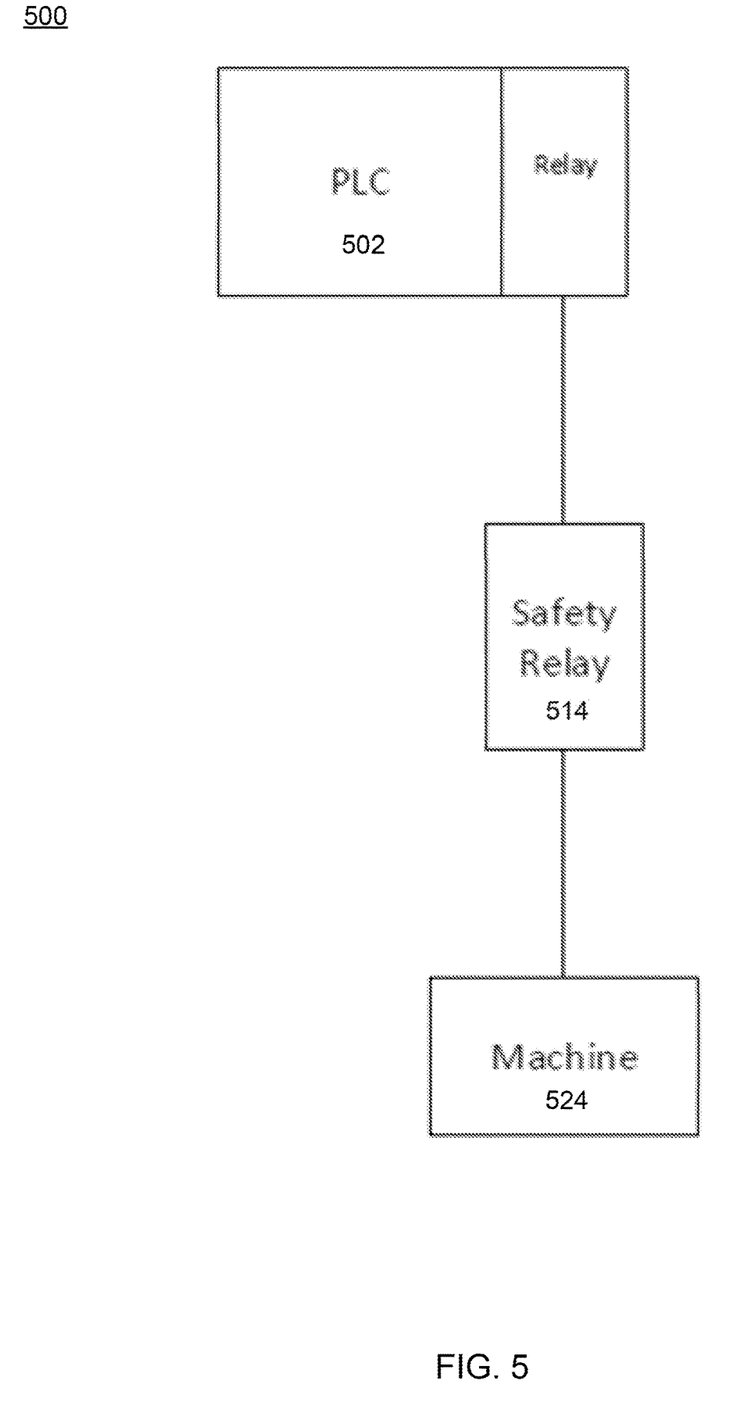
FIG. 5 is a schematic diagram depicting an example of an emergency safety system 100, in accordance with an embodiment.

FIG. 5 is a schematic diagram depicting an emergency stop system 500, in accordance with an embodiment. The emergency stop system 500 includes a programmable logic controller ("PLC") with relay device 502 coupled to a safety relay 514 and machine 524. Although in this embodiment the emergency stop system 500 is shown and described as having a particular number of controllers, devices, relays, and machines, in other embodiments, similar emergency stop systems can include any suitable number of controllers, devices, relays, and machines. In other embodiments, for example, a PLC with relay device can be coupled to multiple safety relays and machines such that the PLC with relay can selectively communicate and/or control (as described in further detail herein) one or more machines in a system having multiple machines in motion.

The machine 524 can be any machine capable of being a machine in motion, such as, for example, as referred to above, an automatic tool subsystem, automated machinery or equipment, a pipe racker, an iron roughneck, a riser catwalk, a pipe catwalk, and/or the like. The PLC with relay device 502 can be of any suitable type, and the safety relay 514 can be of any suitable type.

In use, the PLC with relay 502 can be configured to receive a signal indicative of a potential collision between a machine in motion (e.g., machine 524) and personnel, and in response to and/or based on that received signal, the PLC with relay 502 can be configured to send a signal to the safety relay 514 to stop the machine 524. For example, in an instance in which it is detected that personnel may collide with machine 524, the PLC with relay 502 can be programmed to, based on the detection, send a signal to the safety relay 514 to activate the safety relay 514, and thereby stop the machine 524. In this manner, the emergency stop system 500 is capable of stopping the machine 524 in response to and/or based on a detection that the machine 524 may collide with personnel, without requiring user-intervention.

In yet further instances, in which for example it is detected that personnel may collide with one or more machines, it may be desirable to stop one or more additional machines that although may not be in danger of colliding with personnel, may be in danger of colliding with one or more additional machines due to stoppage of the one or more machines that was in the path of a potential collision. Said another way, in the context of a drill floor on an oil rig, machines often operate in conjunction with one another, so in an example scenario in which the machine 524 is a drawworks machine handling a series of tubulars, and another machine (not shown) is a catwalk machine handling a tubular and moving towards the drawworks, if the drawworks is stopped by the emergency stop system 500 to avoid a collision with personnel, the PLC with relay can be configured to stop the catwalk machine based on (1) the drawworks machine being stopped and/or (2) planned or programmed interaction between the catwalk machine and the drawworks machine.

Although not shown in FIG. 5, in some embodiments, the emergency stop system 500 can include a machine state feedback communication path to communicate a state of one or more machine (e.g., machine 524) to the PLC 502. For example, a signal representative of a state of machine 524 can be sent to PLC 502. The state can be, for example, indicative of the machine 524 being stopped, in motion, in operation, etc. Any suitable number of machine state feedback communication paths can be included, e.g., each machine can have a machine state feedback communication path through which it can communicate the PLC 502.

Figure 6:
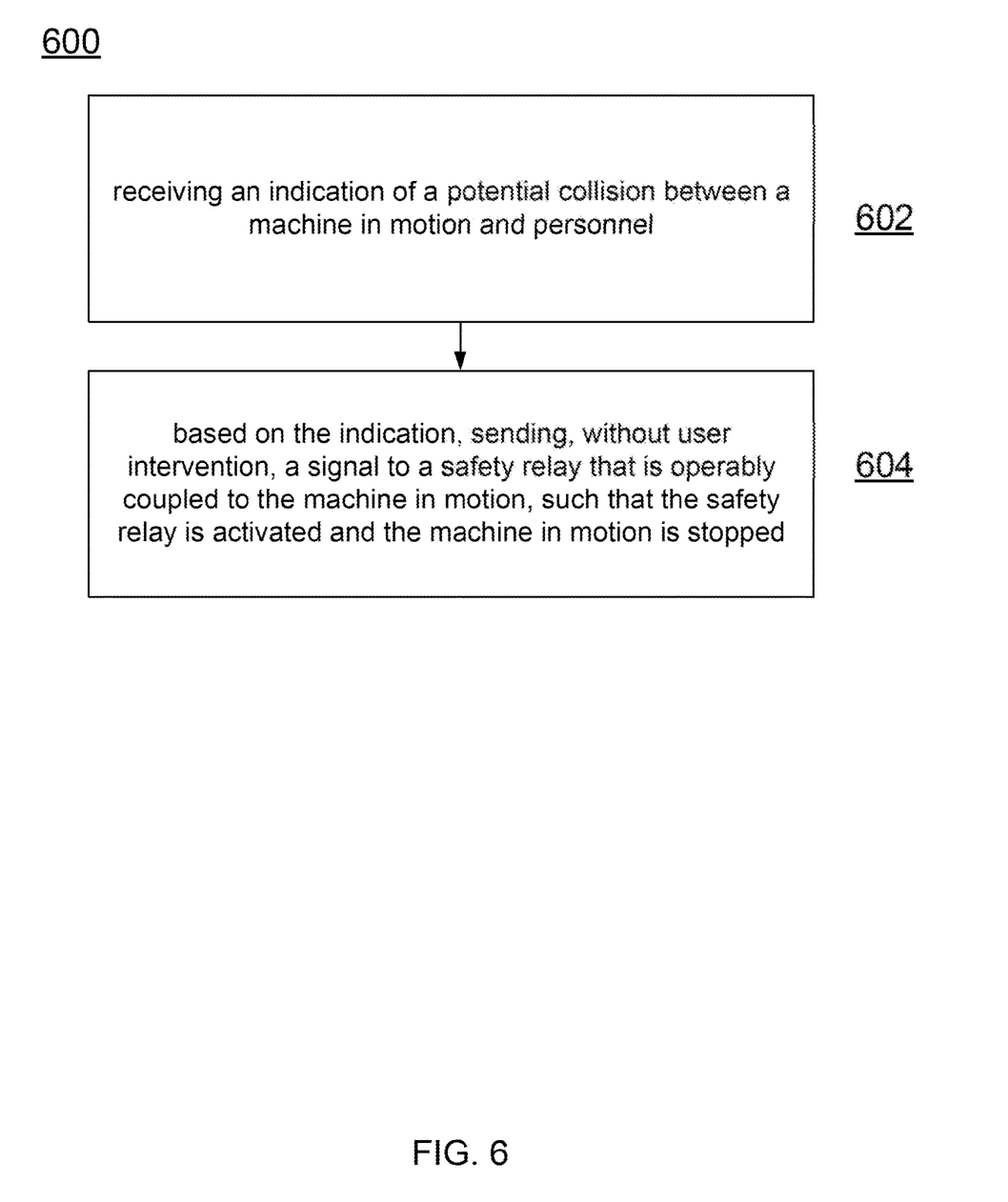
FIG. 6 is a flowchart depicting operational steps of an aspect of an emergency safety system, in accordance with an embodiment.

FIG. 6 is a flowchart depicting operational steps of an aspect of an emergency stop system 600, in accordance with an embodiment. The emergency stop system 600 can in form and/or in function be the same as or similar to any emergency stop system described herein (e.g., emergency stop system 500).

At 602, the emergency stop system 600 receives an indication of a potential collision between a machine in motion and personnel. The indication, for example, in some instances, can be received at and/or processed by a controller (e.g., programmable logic controller 502, with relay). At 604, based on the indication of the potential collision between the machine in motion and personnel, a signal can be sent, without user intervention, to a safety relay (e.g., safety relay 514), such that the safety relay is activated and the machine in motion is stopped.

Figure 7:
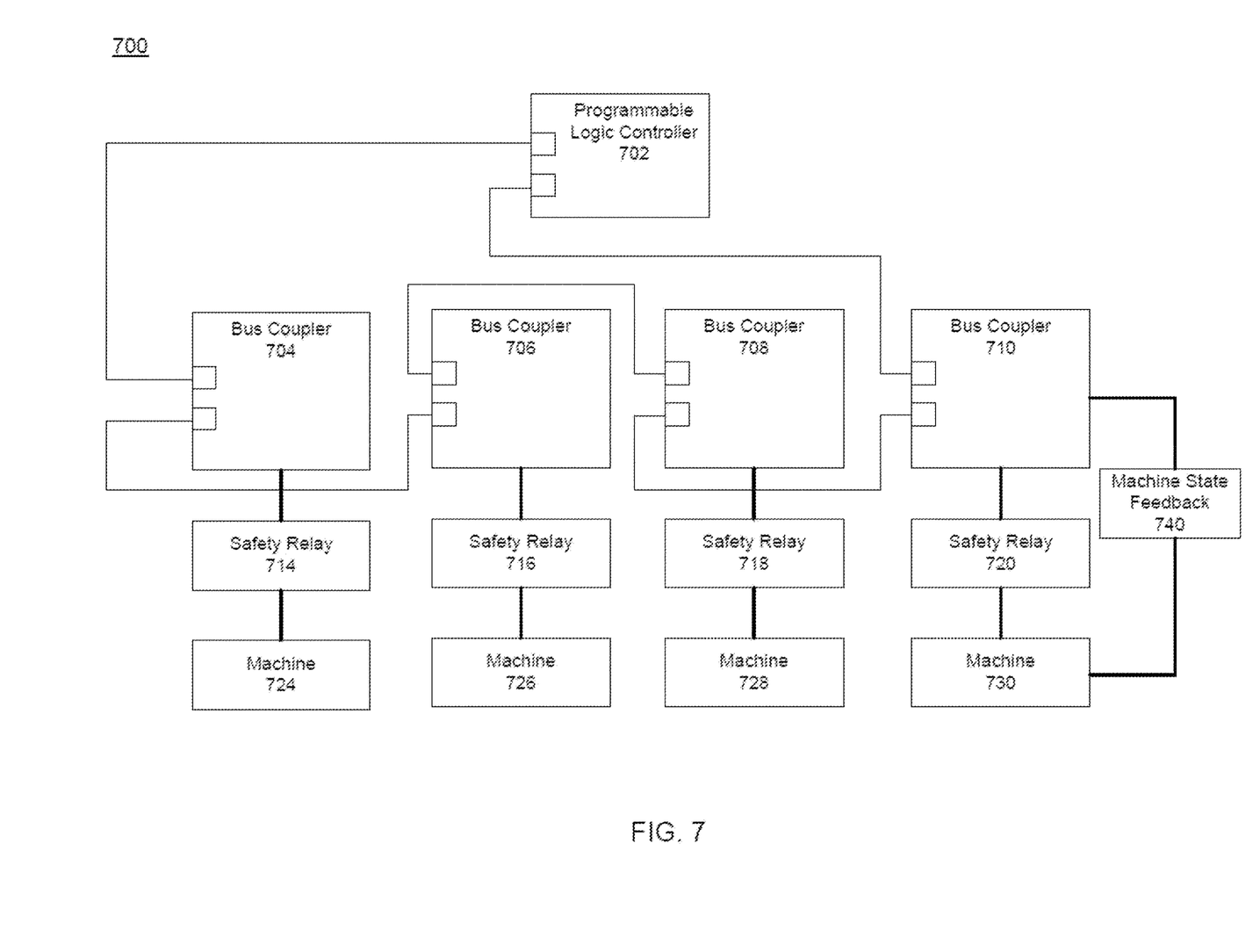
FIG. 7 is a schematic diagram depicting an example of an emergency safety system, in accordance with an embodiment.

FIG. 7 is a schematic diagram depicting an emergency stop system 700, in accordance with an embodiment. The emergency stop system 700 can in form and/or in function be the same as or similar to any emergency stop system described herein (e.g., emergency stop system 100). In this embodiment, the emergency stop system 700 includes a programmable logic controller 702 coupled to a series of bus couplers 704-710, with each bus coupler coupled to a corresponding safety relay 714-720 and machine 724-730. More specifically, as shown, bus coupler 704 is coupled to machine 724 via safety relay 714, bus coupler 706 is coupled to machine 726 via safety relays 716, bus coupler 708 is coupled to machine 728 via safety relay 718, and bus coupler 710 is coupled to machine 730 via safety relay 720. Further, the emergency stop system 700 includes a machine state feedback communication path 740 disposed between the bus coupler 110 and the machine 130. Although in FIG. 7, only one machine state feedback communication path 740 is shown, in some embodiments, any suitable number of machine state feedback communication paths can be included. For example, in some embodiments, multiple machine state feedback paths can be included, e.g., each machine can have a machine state feedback pathway operably coupled to and between the machine and the particular bus coupler to which the machine is coupled via a safety relay. Further, in some embodiments, a single machine state feedback communication path can be operably coupled to multiple machines and/or multiple bus couplers, in any suitable manner or arrangement.

Although in this embodiment the emergency stop system 700 is shown and described as having one programmable logic controller, four bus couplers, four safety relays, four machines, in some embodiments, similar emergency stop systems can include any suitable number of controllers, couplers, relays, and machines.

The machines 724-730 can be any machine capable of being a machine in motion, such as, for example, as referred to above, an automatic tool subsystem, automated machinery or equipment, a pipe racker, an iron roughneck, a riser catwalk, a pipe catwalk, and/or the like. The bus couplers 704-710 can be any suitable type or types of bus couplers and the safety relays 714-720 can be any suitable type or types of safety relays. The machine state feedback communication path 740 can be any suitable path capable of transmitting (e.g., wired and/or wireless) a signal.

In use, the programmable logic controller 702 can be configured to receive a signal indicative of a potential collision between a machine in motion and personnel, and in response to and/or based on that received signal, the programmable logic controller 702 can be configured to send a signal to one or more of the bus couplers 704-710 to selectively stop one or more of the machines 724-730. For example, in an instance in which it is detected that personnel may collide with machine 724, the programmable logic controller 702 can be programmed to, based on the detection, send a signal to bus coupler 704 to activate the safety relay 714, and thereby stop the machine 724. In this manner, the emergency stop system 700 is capable of selectively stopping the machine 724 in response to and/or based on a detection that the machine 724 may collide with personnel, without requiring user-intervention. In this embodiment, after the signal is sent to the bus coupler 704 to activate the safety relay 714, the machine 730 can send a status update via the machine state feedback communication path 740 to indicate a status of the machine 730. In some instances, for example, the status can indicate that the machine 730 has stopped. In some instances, for example, the status can indicate that the machine 730 is operating. The machine 730 can be configured to send such status update(s) periodically and/or in response to a request (e.g., from the programmable logic controller 102).

In further instances, in which for example it is detected that personnel may collide with additional machines, e.g., machine 724 and machine 726, the programmable logic controller 702 can be configured to send a signal to (1) bus coupler 704 to activate the safety relay 714, and thereby stop the machine 724, and to (2) bus coupler 706 to activate the safety relay 716, and thereby stop the machine 726.

In yet further instances, in which for example it is detected that personnel may collide with one or more machines, it may be desirable to stop one or more additional machines that although may not be in danger of colliding with personnel, may be in danger of colliding with one or more additional machines due to stoppage of the one or more machines that was in the path of a potential collision. Said another way, in the context of a drill floor on an oil rig, machines often operate in conjunction with one another, so in an example scenario in which the machine 724 is a drawworks machine handling a series of tubulars, and the machine 726 is a catwalk machine handling a tubular and moving towards the drawworks, if the drawworks is stopped by the emergency stop system 700 to avoid a collision with personnel, the programmable logic controller 702 can be configured to stop the catwalk machine based on (1) the drawworks machine being stopped and/or (2) planned programmed interaction between the catwalk machine and the drawworks machine.

Figure 8:
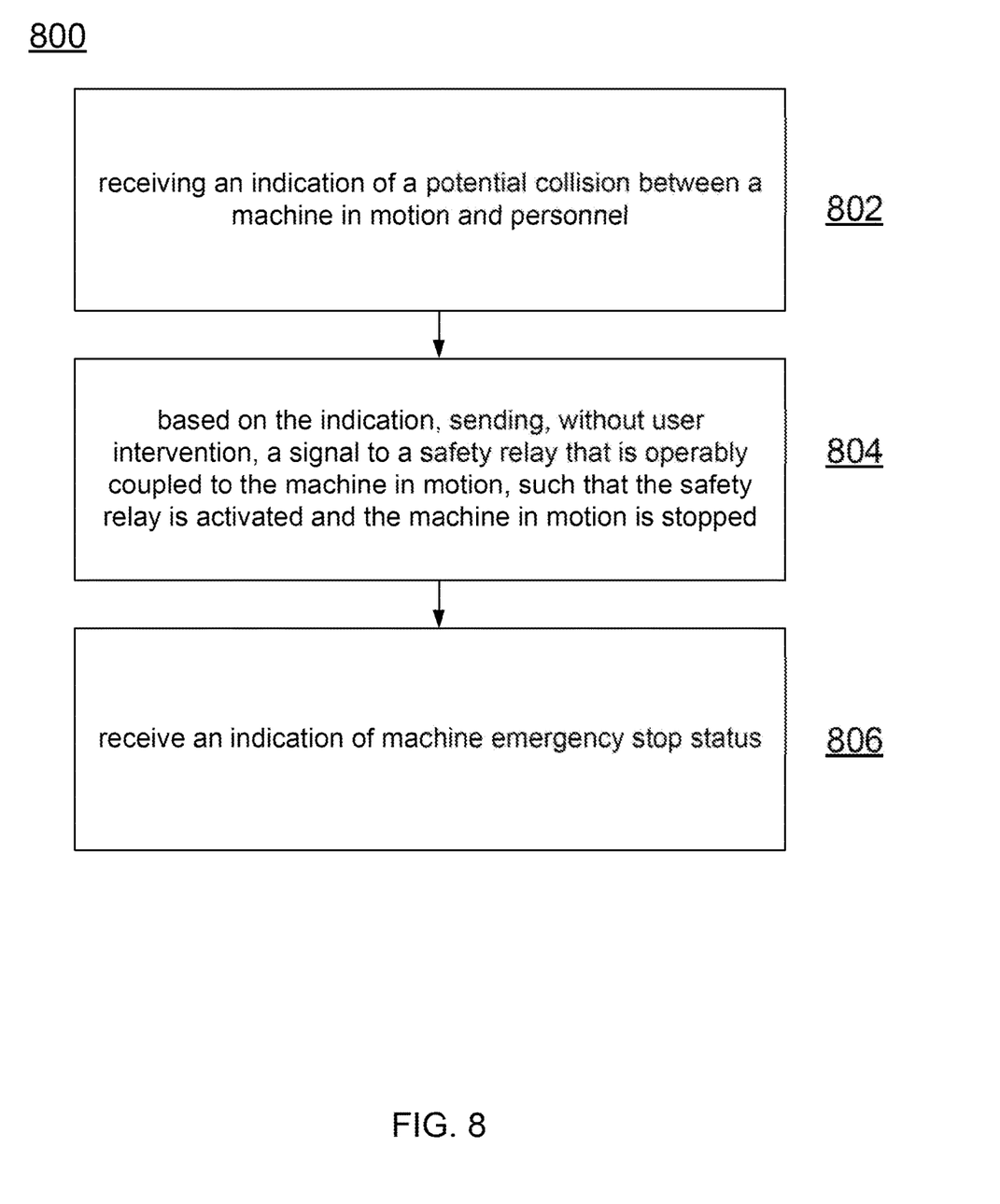
FIG. 8 is a flowchart depicting operational steps of an aspect of an emergency safety system, in accordance with an embodiment.

FIG. 8 is a flowchart depicting operational steps of an aspect of an emergency stop system 800, in accordance with an embodiment. The emergency stop system 800 can in form and/or in function be the same as or similar to any emergency stop system described herein (e.g., emergency stop system 700).

At 802, the emergency stop system 800 receives an indication of a potential collision between a machine in motion and personnel. The indication, for example, in some instances, can be received at and/or processed by a controller (e.g., programmable logic controller 702). At 804, based on the indication of the potential collision between the machine in motion and personnel, a signal can be sent, without user intervention, to a safety relay via a bus coupler (both the safety relay and the bus coupler being coupled to the machine in motion), such that the safety relay is activated and the machine in motion is stopped. At 806, an indication is sent via a machine state feedback communication path. The indication is representative of a status or state of the machine that was involved in the potential collision.

Figure 9:
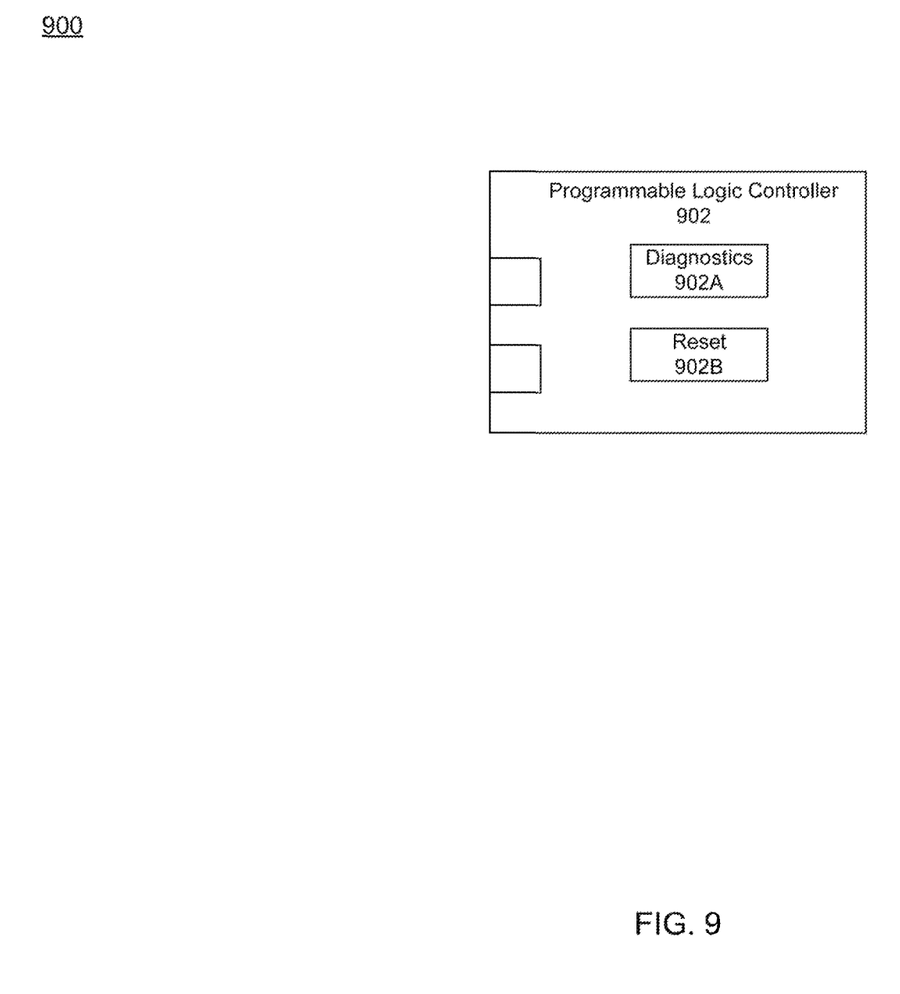
FIG. 9 is a schematic diagram depicting a programmable logic controller of an emergency safety system, in accordance with an embodiment.

FIG. 9 is a schematic diagram depicting programmable logic controller 902 of an emergency stop system 900, in accordance with an embodiment. In this embodiment, the emergency stop system 900 can in form and/or in function be the same as or similar to any emergency stop system described herein. In this embodiment, for clarity and ease of explanation, only the programmable logic controller 902 of the emergency stop system 900 is shown. The function, features, and/or structure of the programmable logic controller 902, in some embodiments, can be incorporated with any of the programmable logic controllers described herein. The programmable logic controller 902, as shown in FIG. 9, includes a diagnostics functionality 902A and a reset functionality 902B. Although shown and described as being functions of the programmable logic controller 902, in some embodiments, one or both of these functions (or portions thereof) can be performed by components physically separate from and operably coupled to the programmable logic controller 902 and/or other portions of the emergency stop system 900.

The diagnostics functionality 902A is configured to indicate the trigger of activation of the emergency stop system 900. For example, in some embodiments, in some instances, stopping of a machine in motion can be triggered by a programmable logic controller, as described in various embodiments here, whereas in other instances stopping of a machine in motion can be triggered by a push of a button located near or on the machine (e.g., personnel can physically push an emergency stop button collocated with or located on a particular machine). The diagnostics functionality 902A can indicate and/or track the particular trigger of the stopping of the machine. Obtaining a state of a machine, for example, can help avoid unnecessary additional triggering of the emergency stop system 900, and/or aid in troubleshooting the emergency stop system 900.

The reset functionality 902B is configured to effectively reset the emergency stop system 900, or a portion thereof. For example, after a machine(s) is stopped, the reset functionality 902B can return the machine's emergency stop state to an operating condition, and/or any other machines impacted by the stopping of that or other machines.

Some of the embodiments disclosed herein including causing, automatically and without user intervention, and in response to an indication of a potential collision (e.g., between a machine in motion and personnel), a machine to stop or otherwise alter course by effectively cutting power supply to that machine. It should be understood that as described above, for example, in instances in which the machine includes manufacturer-provided hardware and/or software configured to stop the machine (e.g., in an emergency situation), any of the embodiments described herein can include, additionally or alternatively to cutting power supply, actuating the manufacturer-provided hardware and/or software provided emergency stop capability, by, for example, coupling after-market hardware (e.g., bus coupler, relay, etc.) to that manufacturer-provided hardware and/or software.

Various embodiments described herein include one or more safety relays. It should be understood that various relays (including relays not characterized as "safety" relays) can be used by any of the emergency stop systems described herein.

The steps and/or programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The presently disclosed invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages, e.g., such as Python™. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the presently disclosed invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the present disclosure are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present disclosure.

References in the specification to "one embodiment," "an embodiment," "an example embodiment," or the like, indicate that the embodiment described may include one or more particular features, structures, or characteristics, but it should be appreciated that such particular features, structures, or characteristics may or may not be common to each and every disclosed embodiment of the present as disclosed herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with one or more other embodiments, where applicable, whether explicitly described, or not.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Detailed embodiments of the present disclosure are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present disclosure.

The invention claimed is:

1. An apparatus, comprising:
a controller configured to be operably coupled to a series of safety relays, each safety relay being coupled to a machine from a plurality of machines associated with oil drilling on an oil rig and distributed on a drill rig floor,
the controller being configured to receive a signal indicative of a potential collision between personnel on the drill rig floor and any machine from the plurality of machines that is coupled to the at least one of the safety relays that was activated, the signal indicative of the potential collision being based on (1) image analytics conducted on an image captured by an optical camera disposed to capture images of the drill rig floor, and/or (2) a positional sensor disposed at or near the drill rig floor to identify personnel within a predefined or virtual zone associated with any machine from the plurality of machines,
the controller being configured to send, in response to the signal indicative of the potential collision, a signal to at least one of the safety relays from the series of safety relays to activate the at least one of the safety relays, thereby stopping motion of any machine from the plurality of machines that is coupled to the at least one of the safety relays that was activated.

2. The apparatus of claim 1, further comprising a plurality of bus couplers, each bus coupler from the plurality of bus couplers configured to be disposed between the controller and at least one of the safety relays from the series of safety relays,
the controller being configured to send the signal to the at least one of the safety relays via a bus coupler from the plurality of bus couplers.

3. The apparatus of claim 2, wherein the plurality of bus couplers each include a relay component configured to open in response to the signal, and the at least one of the safety relays is configured to energize in response based on the opened relay component.

4. The apparatus of claim 1, wherein the controller is configured to receive a feedback signal from any machine from the plurality of machines that is coupled to the at least one of the safety relays that was activated, the feedback signal indicating a machine emergency stop state.

5. The apparatus of claim 1, wherein the controller is configured to send a reset signal such that at least one of the machines from the plurality of machines that was stopped in response to the at least one of the safety relays being activated such that the at least one of the machine's emergency stop state is returned to an operating condition state.

6. The apparatus of claim 1, wherein a remote input/output device from a series of remote input/output devices is disposed between and operably coupled to the controller and a safety relay from the series of safety relays, the controller being configured to send the signal to the at least one of the safety relays from the series of safety relays via at least one remote input/output device from the series of remote input/output devices.

7. A method, comprising:
receiving a signal indicative of a potential collision between an oil drilling machine in motion on a drill rig floor and personnel on the drill rig floor, the signal indicative of the potential collision being based on (1) image analytics conducted on an image captured by an optical camera disposed to capture images of the drill rig floor, and/or (2) a positional sensor disposed at or near the drill rig floor to identify personnel within a predefined or virtual zone associated with the machine in motion; and
based on the signal indicative of the potential collision, sending, without user intervention, a signal to a safety relay such that the safety relay is activated and the machine in motion is stopped, the machine in motion being operably coupled to the safety relay.

8. The method of claim 7, wherein a bus coupler is operably coupled to the safety relay, the sending the signal to the safety relay including sending the signal to the bus coupler, which is then routed from the bus coupler to the safety relay.

9. The method of claim 7, further comprising receiving a feedback signal from the machine in motion indicative of the machine in motion being in an emergency stop state.

10. The method of claim 7, sending a reset signal such that the safety relay is reset, thereby allowing the machine in motion that was stopped to return to operation.

11. The method of claim 7, sending a reset signal such that the machine in motion that was stopped is transitioned from an emergency stop state to an operating condition state.

* * * * *